US012541737B1

(12) United States Patent
Bennett et al.

(10) Patent No.: US 12,541,737 B1
(45) Date of Patent: Feb. 3, 2026

(54) SECURE ITEM SHOPPING, CHECKOUT, AND PICKUP

(71) Applicant: NCR Voyix Corporation, Atlanta, GA (US)

(72) Inventors: Gina Torcivia Bennett, Lawrenceville, GA (US); Kip Oliver Morgan, Atlanta, GA (US); Julia Anne Ogilvy, Cumming, GA (US); John Kennedy, Atlanta, GA (US); Jerry Steven Massey, Lawrenceville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/790,716

(22) Filed: Jul. 31, 2024

(51) Int. Cl.
| | |
|---|---|
| *G06Q 10/0836* | (2023.01) |
| *B65G 1/137* | (2006.01) |
| *G06Q 10/087* | (2023.01) |
| *G06Q 20/20* | (2012.01) |
| *G06Q 30/0601* | (2023.01) |

(52) U.S. Cl.
CPC ....... *G06Q 10/0836* (2013.01); *B65G 1/1373* (2013.01); *G06Q 10/087* (2013.01); *G06Q 20/209* (2013.01); *G06Q 30/0633* (2013.01)

(58) Field of Classification Search
None
See application file for complete search history.

(56) References Cited

U.S. PATENT DOCUMENTS

| | | | |
|---|---|---|---|
| 2005/0061870 A1* | 3/2005 | Stockton | G07G 3/003 235/380 |
| 2010/0116892 A1* | 5/2010 | Hollins | H04N 1/00307 235/494 |
| 2016/0247219 A1* | 8/2016 | Sorensen | G06F 16/9535 |
| 2019/0362307 A1* | 11/2019 | Agasti | G06Q 30/0635 |
| 2019/0392506 A1* | 12/2019 | Bogolea | G06Q 30/0633 |

OTHER PUBLICATIONS

Tebaldi, Letizia, et al. "RFID technology in Retail 4.0: state-of-the-art in the Fast-Moving Consumer Goods field." International Journal of RF Technologies 13.2 (2023): 105-133. (Year: 2023).*

* cited by examiner

*Primary Examiner* — George Chen
(74) *Attorney, Agent, or Firm* — Schwegman Lundberg & Woessner, P.A.

(57) ABSTRACT

An innovative retail checkout system utilizes radio frequency identification (RFID) technology to enhance security and streamline the shopping experience. Customers use RFID stickers linked to their loyalty accounts and attach them to items they wish to buy. Items are then collected by automated pickers, either human or robotic, and are pre-bagged for pickup. At self-checkout terminals, customers review, delete any unwanted items, add any desired new items, and pay for their items. Post-payment, customers receive a receipt or barcode on their phone, granting access to a secure pickup area. Here, customers reshow their code to retrieve their pre-bagged purchases. This system ensures that customers only handle or possess items after payment, significantly reducing theft opportunities. The integration of RFID tags not only secures transactions but also facilitates efficient item tracking and inventory management, enhancing the overall shopping experience and promoting the use of loyalty programs.

20 Claims, 4 Drawing Sheets

SECURE ITEM SHOPPING, CHECKOUT, AND PICKUP

BACKGROUND

In retail environments, particularly those utilizing self-checkout systems, several challenges persist that compromise efficiency, security, and customer satisfaction. These challenges include the high incidence of theft, often facilitated by the self-service nature of these systems where customers handle and bag their own purchases. This situation is exacerbated by the difficulty in monitoring whether items leaving the store are paid for, leading to significant losses for retailers. Additionally, the physical management of shopping carts and the process of bagging items can detract from the customer experience, making shopping cumbersome and less enjoyable. Furthermore, the existing systems do not adequately prevent the common theft tactics such as barcode switching or unauthorized removal of items. These issues highlight a critical need for an improved retail checkout system that enhances security, streamlines the shopping and checkout process, and reduces the potential for theft, thereby providing a more satisfying shopping experience for consumers and safeguarding the retailer's assets.

DETAILED DESCRIPTION

Figure 1A:
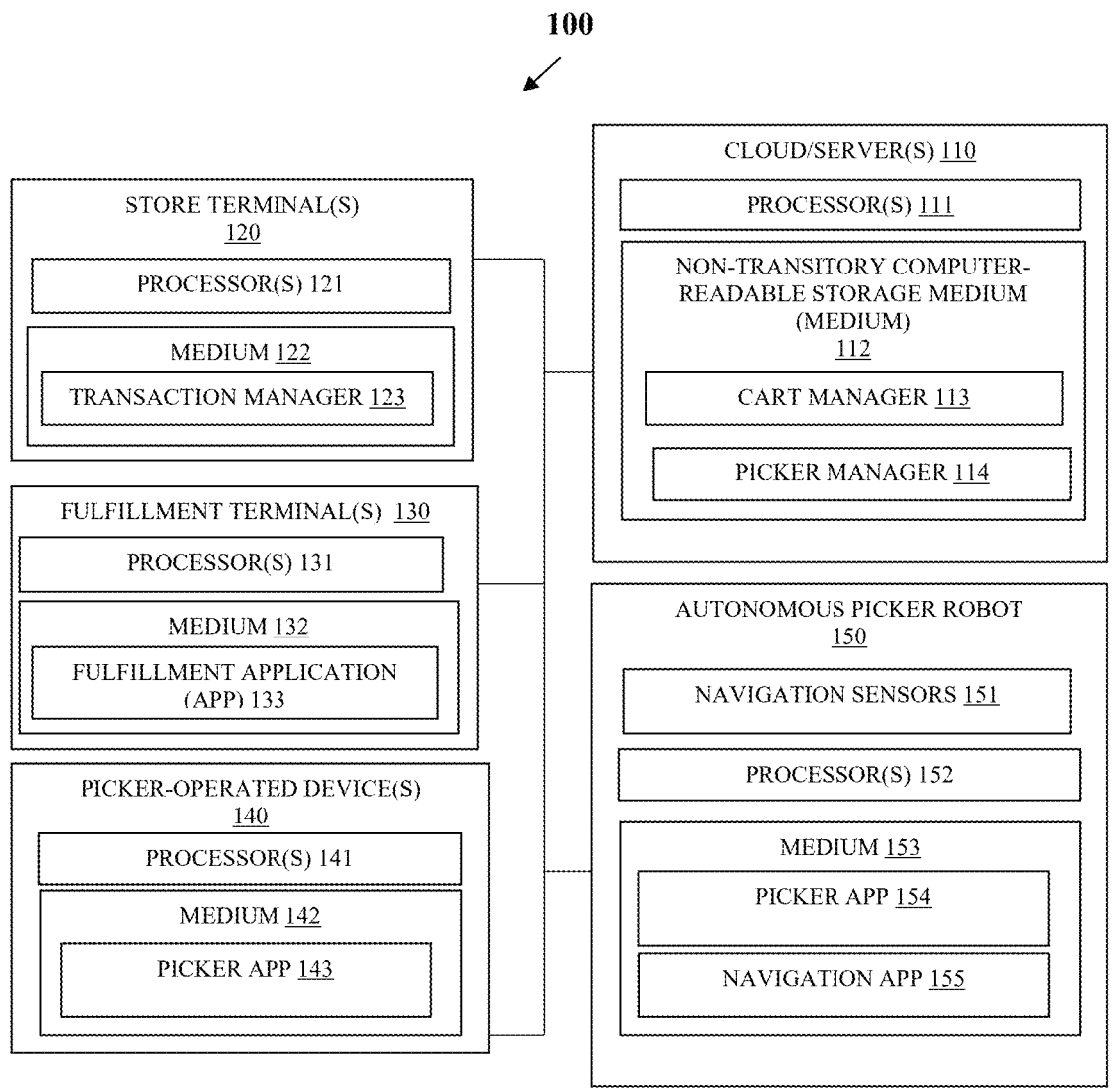
FIG. 1A is a diagram of a system for secure item shopping, checkout, and pickup, according to an example embodiment.

In the evolving landscape of retail, self-checkout systems have become increasingly prevalent, offering convenience and speed to consumers. However, these systems are fraught with challenges that undermine their effectiveness and security. One of the primary issues is the significant risk of theft, which is facilitated by the self-service nature of these systems where consumers directly handle and bag merchandise. This setup often makes it difficult for retailers to monitor and verify that all items leaving the store are duly paid for, leading to substantial revenue losses. Additionally, the physical handling of items and the use of shopping carts can detract from the customer experience, making shopping cumbersome and less enjoyable. Furthermore, the existing self-checkout systems do not adequately address common theft tactics such as barcode switching or the unauthorized removal of items, posing continuous security challenges.

Embodiments of the technology disclosed herein address these challenges by introducing a sophisticated technical solution that solves the aforementioned problems at least in part by integrating radio frequency identification (RFID) technology into the retail environment. According to embodiments of the disclosed technology, the shopping and checkout process is transformed by allowing customers to use RFID stickers, which are linked to their loyalty accounts, to tag items they intend to purchase. These tagged items are then collected based on real-time data by automated pickers—either human or robotic—, pre-bagged, and made ready for checkout. In this manner, the direct handling of merchandise by customers before payment is significantly minimized, thereby reducing the opportunities for theft. The term "RFID sticker" is used herein interchangeably with the term "RFID tag," or variations thereof. Moreover, an RFID sticker or tag may be any object, label, etc. that includes an antenna capable of emitting/receiving radio frequency (RF) signals and an RFID chip or integrated circuit that stores an identifier of the RFID tag and potentially other information such as a consumer loyalty identifier, as is the case with various embodiments of the technology disclosed herein.

During checkout, the system and methods disclosed herein allow customers to review their selections on a self-service terminal, make any necessary adjustments, and finalize their purchases. Post-payment, customers are granted access to a secure pickup area through a verification process involving a receipt or a digital barcode on their phone. This secure area ensures that customers only take possession of items after payment has been confirmed, further enhancing the security of the transaction. By streamlining the shopping process and integrating enhanced security measures, the technical teachings provided herein not only improve the efficiency of retail operations but also enhance the overall customer experience, promoting greater satisfaction and loyalty.

As used herein, a "consumer," "customer," and/or "user" can be used synonymously and interchangeable. This refers to an individual shopping in a store to purchase items, checking out to pay for their items, and obtaining their purchased items in a designated and secure pickup area of the store.

FIG. 1A is a diagram of a system 100 for secure item shopping, checkout, and pickup, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of secure item shopping, checkout, and pickup, presented herein and below.

System 100 includes a cloud/server 110 (hereinafter "cloud 110" or "cloud server 110"), store terminals 120, one or more fulfillment terminals 130 (terminals 130), picker-operated devices 140, and, optionally, an autonomous picker robot 150. Cloud 110 includes at least one processor 111 and a non-transitory computer-readable storage medium (hereinafter "medium") 112, which includes instructions for a cart manager 113 and a picker manager 114. The instructions when executed by processor 111 cause processor 111 to perform processing or operations discussed herein and below with respect to 113 and 114.

Each terminal 120 includes at least one processor 121 and a medium 122, which includes instructions for a transaction manager 123. The instructions when executed by processor 121 cause processor 121 to perform processing and operations discussed herein and below with respect to 123.

Each fulfillment terminal 130 includes at least one processor 131 and a medium 132, which includes instructions for fulfillment application ("app") 133. The instructions when provided to and executed by processor 131 cause processor 131 to perform the processing or operations discussed herein and below with respect to fulfillment app 133.

Each picker-operated device 140 includes at least one processor 141 and a medium 142, which includes instructions for one or a picker app 143. The instructions when provided to and executed by processor 141 cause processor 141 to perform the processing or operations discussed herein and below with respect to 143.

The autonomous picker robot 150 includes navigation sensors 151, at least one processor 152, and a medium, which includes instructions for a picker app 154 and a navigation app 155. The instructions when provided to and executed by processor 152 cause the processor 152 to perform the processing or operations discussed herein and below with respect to 154 and 155. The autonomous picker robot 150 also include electromechanical components that cause the autonomous picker robot 150 to independently travel and traverse a store using the navigation app 155.

Initially, a store provides or makes available strips and/or booklets of RFID stickers to their customers. Each RFID sticker is linked to a loyalty account of a customer. This permits the sticker to be identified in store, read by an RFID reader, and linked to a specific customer. In an embodiment, the RFID stickers are reusable. In other words, a customer can purchase an item having an RFID sticker linked to the customer's loyalty account affixed to the item, take the item home, remove the RFID sticker and reuse it to purchase another item during a subsequent trip to a store.

The customers uses the RFID stickers assigned to the customer to shop in a store by walking about the store and placing an RFID sticker on each specific item that the customer desires to purchase. That is, the exact item that the customer wants to purchase has an RFID sticker affixed to it during a shopping visit of the customer to a store. This is unlike online shopping in which the customer selects an item based on a canned image. With the teachings herein, the customer physically inspects and selects the specific item that the customer wants to purchase.

Customers do not carry items with them while shopping in the store nor do customer have to place items in carts or baskets while shopping. This allows the store to monitor the customers in the store using cameras and computer vision to ensure that customers are not in possession of items as they traverse the store. As a result, theft detection becomes an easier computer vision task since the computer vision applications can raise alerts when customers take possession of item for more than a configured period of time and continue to traverse the store with the item in their possession. As a result, the manner in which the customers shop allow for improved and more accurate theft detection.

After customers have affixed their RFID stickers to items within the store or while the customers are still shopping but have placed some RFID stickers on some items, pickers, through picker-operated devices 140 using picker apps 143, and/or autonomous picker robot 150, through picker app 154 are guided to items with RFID stickers. The tagged items are picked and taken to a fulfillment area of the store.

In an embodiment, the autonomous picker robot 150 includes an RFID reader that emits radio waves and receives RF signals back from the RFID stickers. This allows the autonomous picker robot 150 to identify each item with an RFID sticker within the store and collect the item and further return the item to the fulfillment area of the store.

In an embodiment, the picker-operated devices 140 include an RFID reader, such as a Near Field Communication (NFC) transceiver. This allows the picker apps 143 to identify the items with the RFID stickers for the pickers within the store. The picker collects the items and returns the items to the fulfillment area of the store.

In an embodiment, the store includes a plurality of RFID readers or NFC transceivers situated throughout the store. The RFID readers identify items with RFID stickers and reports their in-store locations to picker manager 114. Picker manager 114 uses a store planogram to dispatch pickers or the autonomous picker robot 150 to the precise shelf or display location where the item is then picked and returned to the fulfillment area of the store. In an embodiment, the picker manager 114 assembles lists for pickers and the autonomous picker robot 150 for items to pick for efficiency in picking the items within the store. For example, suppose 5 different customers have affixed one or more RFID stickers to various items in a particular aisle of the store, picker manager 114 would dispatch a single picker or the autonomous picker robot 150 to the aisle to pick all the items in the aisle with the RFID stickers.

In an embodiment, picker manager 114 generates an optimal navigational route for picking the items with the RFID stickers. The optimal navigational route is provided to the picker apps 143 and/or to picker app 154 or navigation app 155 of the autonomous picker robot 150. The picker manager 114 generates the optimal navigation route through the store for picking RFID sticker items tagged by customers using the planogram for the store and using reported presences of the tagged items reported by the RFID readers dispersed throughout the store.

Once the tagged items are returned to the fulfillment area of the store, a fulfillment terminal 130 is used to scan the RFID stickers, associate each tagged item with a specific customer, and interact with cart manager 113 to populate each customer's virtual cart with their selected items. Each customers' items are separated and bagged and linked to each customer's virtual cart. The bagged items are then moved to a secure pickup area of the store. In an embodiment, the secure pickup area is adjacent or next to the fulfillment area of the store.

Each customer, after tagging their items for purchase, checkouts out at a store terminal 120. The customer is identified for the checkout by suppling loyalty identifying information or via facial recognition linked to the customer. Transaction manager 123 obtains the customer's items associated with the checkout from the virtual cart generated by cart manager 113 after the items are scanned at the fulfillment terminal 130. Transaction manager 123 presents the item and transaction details for the customer's virtual cart via a transaction interface of store terminal 120. The customer interacts with the transaction interface to pay for the items and/or modify the items being purchased.

Any item being removed or added by the customer causes transaction manager 123 to update the customer's virtual cart and responsive thereto cart manager 113 sends an alert to fulfillment application 133. The bagged items for the customer are adjusted based on the customer changes and returned to the secure pickup area. That is the transaction interface of the transaction manager 123 permits the customer to modify their checkout to remove unwanted items and/or add new items.

Once the customer pays for the items during checkout, transaction manager 123 causes a receipt to be printed and/or causes a quick response (QR) code to be sent to a registered device of the customer. In an embodiment, the printed receipt includes a QR code.

After successful payment, the customer scans or shows the receipt or QR code to gain entry to the secure pickup area. In an embodiment, the receipt or QR code is scanned at a gate or door and verified before the gate or door to the secure pickup area is opened to provide access to the customer. The customer once inside the secure pickup area, reshows or rescans their receipt or QR code to obtain their bagged items. The customer then exits the store through an egress of the secure pickup area.

In an embodiment, the customer scans the receipt or QR code displayed on their device to unlock a secure locker. The secure locker includes the customer's bagged items. In this way, the outward facing secure pickup area that the customer has access to does not have to be manned by any store staff.

At no time during checkout at the store terminal 120, is the customer in possession of any item. Furthermore, the customer never takes possession for more than a configurable period of time to allow the customer to inspect an item while the customer is within the store and shopping. This allows computer vision applications of the store to closely monitor any customers that travel the store with items and raise alerts to staff of potential theft. The computer vision applications do not have to identify the items nor distinguish between items in a cart and not in a cart because customers should not be in possession of items while traversing the store. As a result, the computer vision applications are faster response times and are more accurate in identifying potential theft situations. Consequently, the teachings presented herein improve theft detection which is a major concern of stores in the industry.

System 100 provides a dramatic improvement over existing loss prevention technologies available in the industry because customers are expected to not be in possession of items until after they have paid for their items. Furthermore, customers often complain about how many times they have to handle each item during a shopping visit by placing each item in a cart, removing each item from the cart to scan each item at checkout, placing each item in a bag, and removing each item at home. With the teachings presented herein, the customer only has to remove each item at home and does not have to push a cart around a store trying to avoid other customers in the store. The stores do not have to manage carts within the stores and can decrease the number of carts necessary since carts may only be necessary in the secure pickup area and only then when the size, weight, and number of items purchased require a cart. Customer loyalty is increased because typical shopping frustrations are eliminated, such has handling items and carts within the store and during checkout. Improved customer satisfaction will also result in more customers opting in for loyalty programs with the store which increases loyalty adoption and participation. Further, inventory tracking and replenishment is improved since the exact items picked are known in real time. Finally, concerns over theft at self-service terminals (SSTs) or self-checkouts are alleviated since the customers are expected to not be in possession of the items at checkout and are not expected to scan the items themselves at checkout.

Notably, conventional approaches to theft detection focus on computer vision that attempts to identify items in the possession of a shopper and cross reference those identified items with items that are processed by the customer during checkout. This is difficult to do in a timely manner and is prone to mistakes when items are obscured. System 100 allows computer vision to focus only on when a customer is in possession of an item for longer than a preconfigured period or time or when the customer travels in the store with the item. This permits the computer vision applications to raise alerts in a timelier fashion than conventional approaches with more accuracy in theft detection.

Moreover, system 100 utilizes reusable RFID stickers. This is environmentally friendly and cost effective by producing less waste and encouraging reuse of the RFID stickers.

Figure 1B:
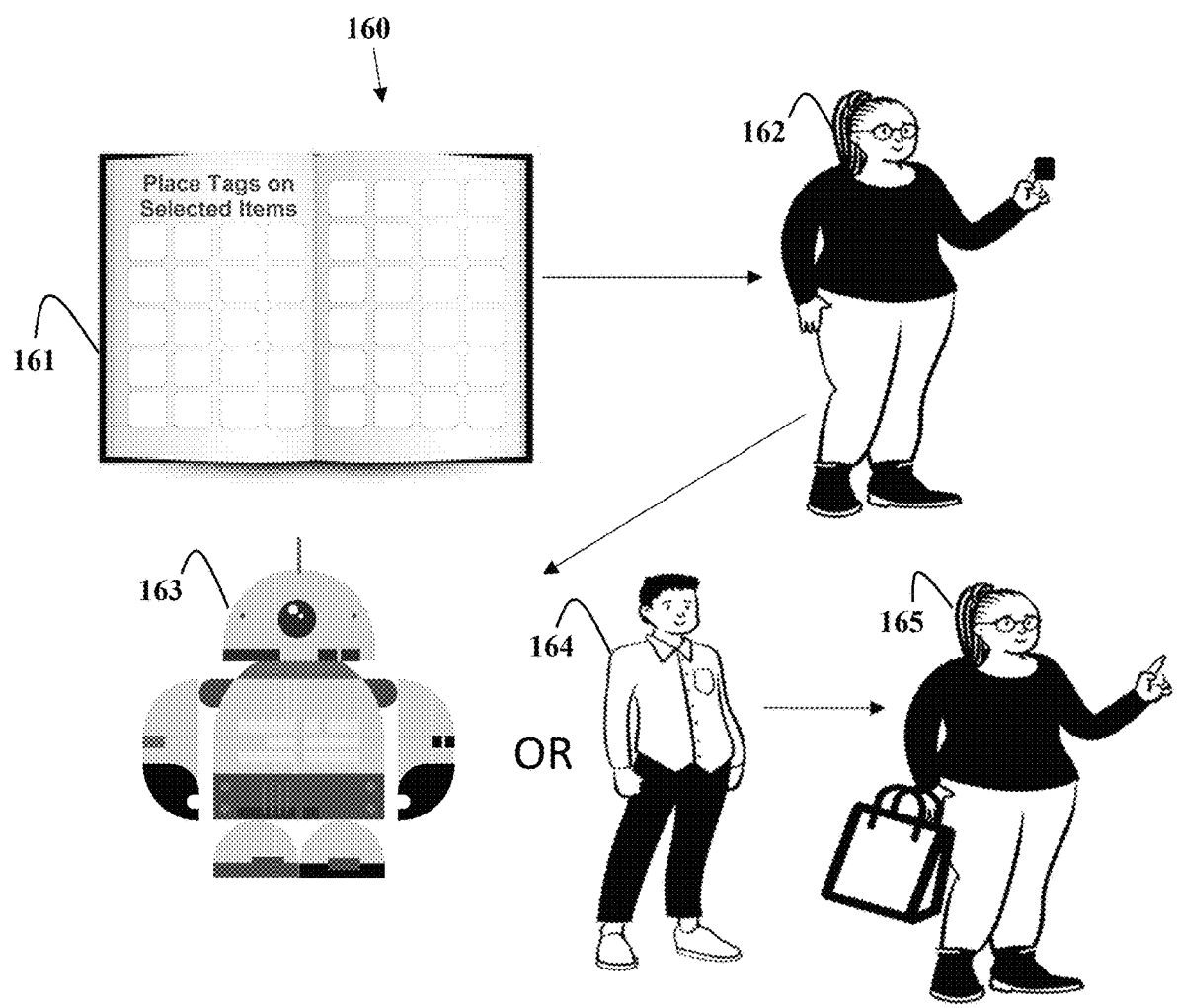
FIG. 1B is a pictorial diagram depicting example user interactions for secure item shopping, checkout, and pickup, according to an example embodiment.

FIG. 1B is a pictorial diagram depicting example user interactions 160 for secure item shopping, checkout, and pickup, according to an example embodiment. At 161, a customer is issued a booklet of reusable RFID stickers linked to the loyalty account of the customer. At 162, the customer visits the store and places the RFID stickers on specific items that the customer has inspected and desires to purchase. At 163 and/or 164, the autonomous picker robot 150 or a picker using a picker-operated device 140 picks the items with the RFID stickers and takes them to a fulfillment area of the store. In the fulfillment area, the customer's items are bagged and a virtual cart with the item details is linked to the customer's loyalty account. The customer checkouts out via a store terminal 120 and pays for the items. A receipt or QR code is issued to the customer, the customer uses the receipt of QR code to gain access to a secure pickup area of the store and retrieves their bagged items. At 165, the customer exits the store with their purchased items.

In an embodiment, the secure pickup area is located on an outside portion of the store. For example, drive up locations or drive thru windows on the outside of the store are accessed by customers through their cars via a secure gate. The secure gate opens when the customer scans their receipt of QR code providing the customer access to the drive up locations or drive thru windows of the secure pickup area. Staff then identifies the customer via their scan and delivers the purchased items directly into the car of the customer.

In an embodiment, cart manager 113 and picker manager 114 are subsumed into a local store server. That is, the entire system can be operated on a local store server without accessing any cloud.

Figure 2:
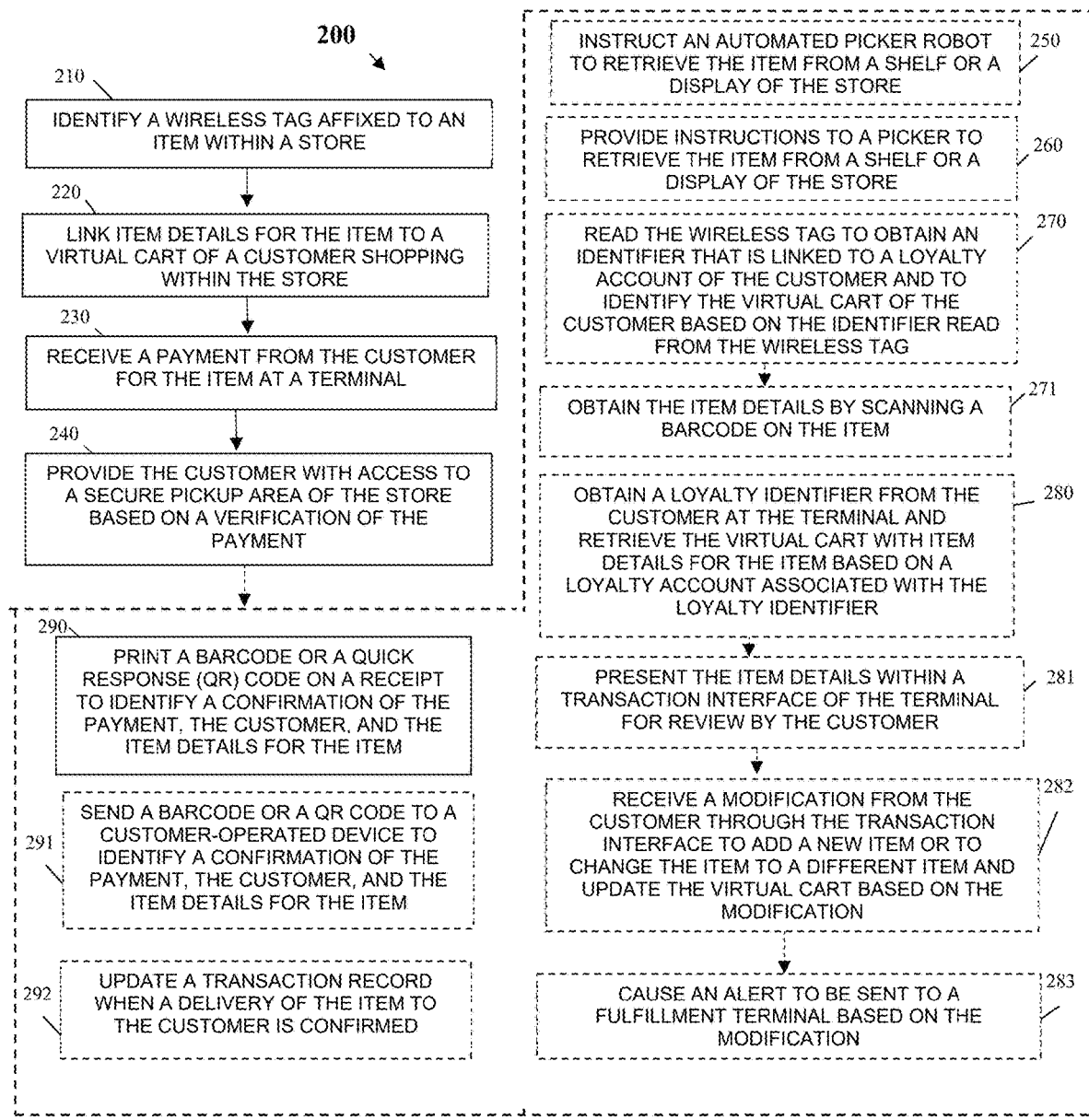
FIG. 2 is a flow diagram of a method for secure item shopping, checkout, and pickup, according to an example embodiment.

The above-referenced embodiments and other embodiments are now discussed with reference to FIGS. 2 and 3. FIG. 2 is a flow diagram of a method 200 for secure item shopping, checkout, and pickup, according to an example embodiment. The software module(s) that implements the method 200 is referred to as a "secure shopping manager." The secure shopping manager is implemented as executable instructions programmed and residing within memory and/or a non-transitory computer-readable (processor-readable) storage medium and executed by one or more processors of one or more devices. The processor(s) of the device(s) that executes the secure shopping manager are specifically configured and programmed to process the secure shopping manager. The secure shopping manager may have access to one or more network connections during its processing. The network connections can be wired, wireless, or a combination of wired and wireless.

In an embodiment, the device that executes the secure shopping manager is cloud 110. In an embodiment, the device that executes the secure shopping manager is a retail server of a local store server. In an embodiment, the secure shopping manager executes on multiple devices 110, 120, 130, 140, and/or 150. In an embodiment, the secure shopping manager is cart manager 113, 114, 123, 133, 143, and/or 154.

At 210, secure shopping manager identifies a wireless tag affixed to an item within a store. In an embodiment, the wireless tag is an RFID sticker or an NFC tag.

At 220, the secure shopping manager links item details for the item to a virtual cart maintained for a customer who is shopping within the store. At 230, the secure shopping manager receives a payment from the customer for the item at a terminal 120.

At 240, the secure shopping manager provides the customer with access to a secure pickup area of the store. In an embodiment, at 250, the secure shopping manager instructs an automated picker robot to retrieve the item from a shelf or a display of the store. In an embodiment, at 260, the secure shopping manager provides instructions to a picker to retrieve the item from a shelf or a display of the store.

In an embodiment, at 270, the secure shopping manager reads the wireless tag to obtain an identifier that is linked to a loyalty account of the customer. The secure shopping manager also identifies the virtual cart of the customer based on the identifier read from the wireless tag and the link to the loyalty account of the customer. In an embodiment of 270 and at 271, the secure shopping manager obtains the item details by scanning a barcode on the item.

In an embodiment, at 280, the secure shopping manager obtains a loyalty identifier from the customer at the terminal. The secure shopping manager uses the loyalty identifier to retrieve the virtual cart with the item details for the item. In an embodiment of 280 and at 281, the secure shopping manager presents the item details within a transaction interface of the terminal for review by the customer.

In an embodiment of 281 and at 282, the secure shopping manager receives a modification from the customer through the transaction interface to add a new item or to change the item to a different item. The secure shopping manager updates the virtual cart based on the modification. In an embodiment of 282 and at 283, the secure shopping manager causes an alert to be sent to a fulfillment terminal based on the modification.

In an embodiment, at 290, the secure shopping manager prints a barcode or a QR code on a receipt to identify a confirmation of the payment, the customer, and the item details for the item. In an embodiment, at 291, the secure shopping manager sends a barcode or a QR code to a customer-operated device to identify a confirmation of the payment, the customer, and the item details for the item. In an embodiment, at 292, the secure shopping manager updates a transaction record when a delivery of the item to the customer is confirmed.

Figure 3:
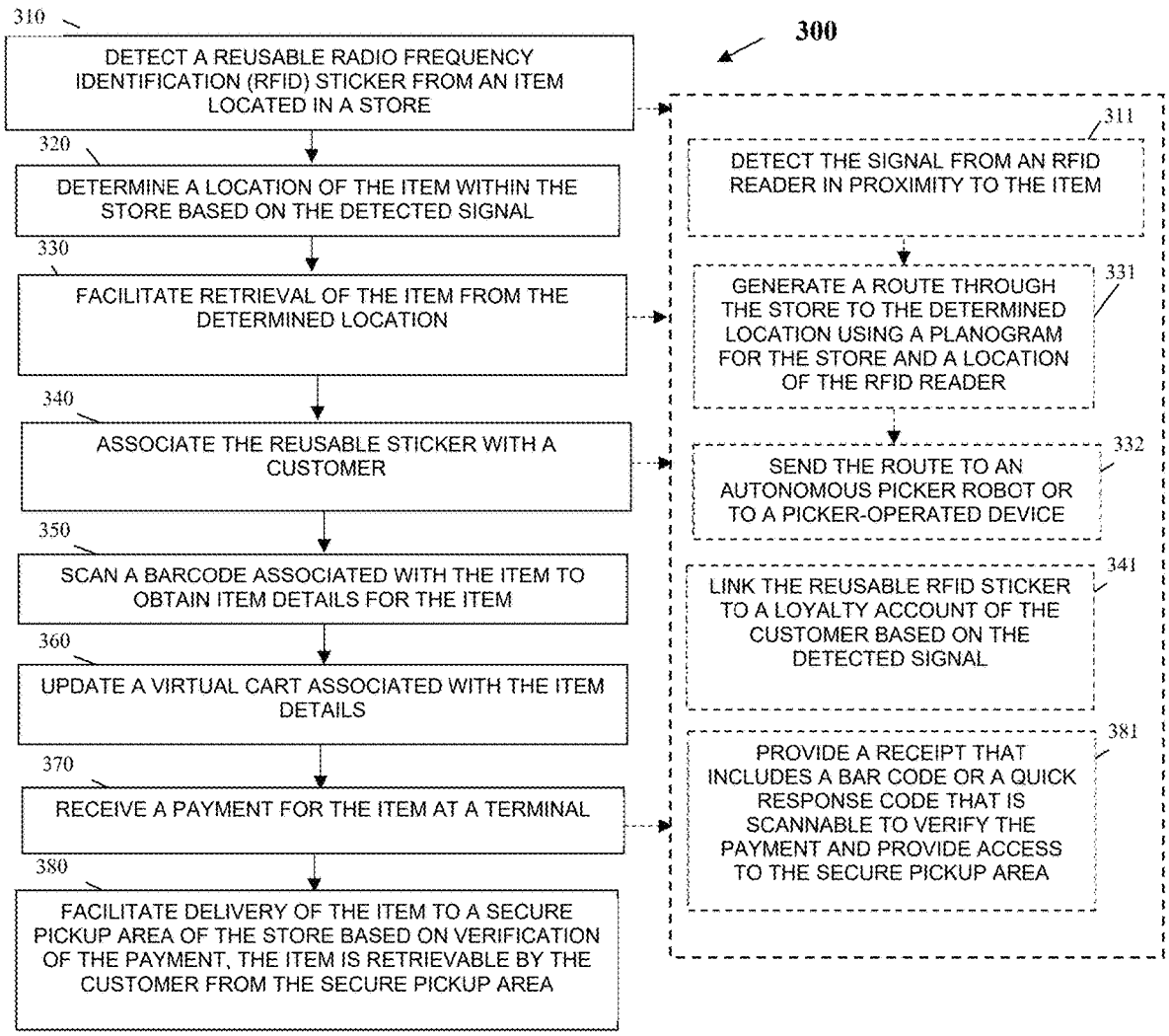
FIG. 3 is a flow diagram of another method for secure item shopping, checkout, and pickup, according to an example embodiment.

FIG. 3 is a diagram of another method 300 for secure item shopping, checkout, and pickup, according to an example embodiment. The software module(s) that implements the method 300 is referred to as a "shopping workflow manager." The shopping workflow manager is implemented as executable instructions programmed and residing within memory and/or a non-transitory computer-readable (processor-readable) storage medium and executed by one or more processors of one or more device(s). The processors that execute the shopping workflow manager are specifically configured and programmed for processing the shopping workflow manager. The shopping workflow manager may have access to one or more network connections during its processing. The network connections can be wired, wireless, or a combination of wired and wireless.

In an embodiment, the device that executes the shopping workflow manager is cloud 110. In an embodiment, the device that executes the shopping workflow manager is a retail server of a local store server. In an embodiment, the shopping workflow manager executes on multiple devices 110, 120, 130, 140, and/or 150. In an embodiment, the secure shopping manager is cart manager 113, 114, 123, 133, 143, 154, and/or method 200 of FIG. 2. The shopping workflow manager presents another, and in some ways, enhanced processing perspective from that which was described above for method 200 of FIG. 2.

At 310, the shopping workflow manager detects a reusable RFID sticker from an item located in a store. In an embodiment, at 311, the shopping workflow manager detects the signal from an RFID reader in proximity to the item.

At 320, the shopping workflow manager determines a location of the item within the store based on the detected signal. causes the item to be picked from a shelf or a display of the store. At 330, the shopping workflow manager facilitates retrieval of the item from the determined location.

In an embodiment of 330 and at 331, the shopping workflow manager generates a route through the store to the determined location using a planogram for the store and a known location of the RFID reader within the store. In an embodiment of 331 and at 332, the shopping workflow manager sends the route to an autonomous picker robot or to a picker-operated device.

At 340, the shopping workflow associates the reusable RFID sticker with a customer. In an embodiment, at 341, the shopping workflow manager links the reusable RFID sticker to a loyalty account of the customer based on the detected signal.

At 350, the shopping workflow manager scans a barcode associated with the item to obtain item details for the item. At 360, the shopping workflow manager updates a virtual cart associated with the item details. At 370, the shopping workflow manager receives a payment for the item at a terminal.

At 380, the shopping workflow manager facilitates delivery of the item to a secure pickup area of the store based on verification of the payment. The item is retrievable by the customer from the secure pickup area.

In an embodiment, at 381, the shopping workflow manager provides a receipt that includes a bar code or a QR code. The barcode and the QR code are scannable to verify the payment and provide access to the secure pickup area.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   identifying a wireless tag affixed to an item within a store, wherein the wireless tag is a reusable radio frequency identification (RFID) sticker linked to a loyalty account of a customer who is shopping within the store;
   scan a barcode on the item to obtain item details for the item;
   linking the item details for the item to a virtual cart of the customer;
   receiving, at a terminal, a payment for the item; and
   providing the customer with access to a secure pickup area of the store based on a verification of the payment;
   instructing an automated picker robot to retrieve the item from a shelf or a display of the store; and
   in response to the automated picker robot retrieving the item, causing the item to be separated and bagged before providing access to the secure pickup area.

2. The method of claim 1, further comprising instructing an automated picker robot to retrieve the item from a shelf or a display of the store.

3. The method of claim 1, further comprising providing instructions to a picker to retrieve the item from a shelf or a display of the store.

4. The method of claim 1, further comprising:
   reading a signal received from the wireless tag to obtain an identifier that is linked to a loyalty account of the customer; and
   identifying the virtual cart of the customer based on the identifier read from the wireless tag.

5. The method of claim 4, further comprising obtaining the item details by scanning a barcode for the item.

6. The method of claim 1, further comprising:
   obtaining a loyalty identifier from the customer at the terminal;
   identifying, based on the loyalty identifier, a loyalty account associated with the customer; and
   retrieving, based on the loyalty account, the virtual cart containing the item details for the item.

7. The method of claim 6, further comprising presenting the item details within a transaction interface of the terminal.

8. The method of claim 7, further comprising:
   receiving input at the transaction interface indicative of a customer modification to add a new item to the virtual cart or to change the item to a different item; and
   updating the virtual cart based on the customer modification.

9. The method of claim 8, further comprising causing an alert to be sent to a fulfillment terminal based on the customer modification.

10. The method of claim 1, further comprising printing a barcode or a quick response code on a receipt that includes a confirmation of the payment, an identification of the customer, and the item details for the item.

11. The method of claim 1, further comprising sending, to a customer-operated device, a barcode or a quick response code that includes a confirmation of the payment, an identification of the customer, and the item details for the item.

12. The method of claim 1, further comprising updating a transaction record when a delivery of the item to the customer is confirmed.

13. A method, comprising:
    detecting a signal received from a reusable radio frequency identification (RFID) sticker affixed to an item within a store, wherein the RFID sticker is a reusable RFID sticker;
    determining a location of the item within the store based on the detected signal;
    facilitating retrieval of the item from the determined location;
    associating the reusable RFID sticker on the item to a customer;
    scanning a barcode on the item to obtain item details for the item;
    updating a virtual cart linked to the customer with the item details;
    receiving a payment for the virtual cart from the customer at a terminal; and
    wherein an automated picker robot is configured to deliver the item to a secure pickup area of the store in response to verification of the payment, wherein the item is retrievable by the customer from the secure pickup area.

14. The method of claim 13, wherein detecting the signal received from the reusable RFID sticker comprises detecting the signal by an RFID reader in proximity to the item.

15. The method of claim 14, wherein facilitating retrieval of the item comprises generating a route through the store to the determined location using a planogram for the store and a location of the RFID reader.

16. The method of claim 15, wherein facilitating retrieval of the item further includes sending the route to an autonomous picker robot or to a picker-operated device.

17. The method of claim 13, wherein associating comprises linking the reusable RFID sticker to a loyalty account of the customer based on the detected signal.

18. The method of claim 13, wherein facilitating delivery of the item to the secure pickup area comprises providing a receipt comprises a barcode or quick response code that is scannable to verify the payment and provide access to the secure pickup area.

19. A system, comprising:
    at least one processor and a non-transitory computer-readable storage medium having stored instructions which, when executed by the at least one processor, cause the at least one processor to:
    identify an item on a shelf or an item display of a store based on a radio frequency (RF) signal received from an RFID tag affixed to the item;
    cause the item to be picked from the shelf or the item display;
    associate the item to a customer by reading an identifier associated with the RFID tag of an RFID sticker;
    scan a barcode on the item to obtain item details;
    link the item details to a virtual cart associated with the customer;
    receive a payment for the virtual cart from the customer at a terminal of the store;
    provide a receipt or a quick response code to the customer, wherein the receipt of the quick response code provides a confirmation of the payment;
    verify the confirmation by scanning the receipt or the quick response code before providing the customer with access of the item associated with the virtual cart in a secure pickup area of the store;
    wherein the RFID sticker is reusable and linked to a loyalty account of the customer; and wherein an automated picker robot is configured to deliver the item to the secure pickup area of the store in response to verification of the payment.

20. The system of claim 19, wherein the at least one processor of the terminal is further configured to:
providing the item to the customer within a secure pickup area.

* * * * *